(12) United States Patent
Li et al.

(10) Patent No.: US 11,518,250 B2
(45) Date of Patent: Dec. 6, 2022

(54) ELECTRO-HYDRAULIC BRAKING SYSTEM AND BRAKING METHOD THEREOF

(71) Applicant: GLOBAL TECHNOLOGY CO., LTD., Nantong (CN)

(72) Inventors: Xun Li, Nantong (CN); Zhaoyong Liu, Nantong (CN); Qindong Gu, Nantong (CN)

(73) Assignee: GLOBAL TECHNOLOGY CO., LTD., Nantong (CN)

(*) Notice: Subject to any disclaimer, the term of this patent is extended or adjusted under 35 U.S.C. 154(b) by 0 days.

(21) Appl. No.: 17/588,452

(22) Filed: Jan. 31, 2022

(65) Prior Publication Data

US 2022/0185118 A1 Jun. 16, 2022

Related U.S. Application Data

(63) Continuation of application No. PCT/CN2021/110824, filed on Aug. 5, 2021.

(30) Foreign Application Priority Data

Aug. 7, 2020 (CN) .......................... 202010787359.3

(51) Int. Cl.
*B60T 13/74* (2006.01)
*B60L 7/26* (2006.01)
(Continued)

(52) U.S. Cl.
CPC ............... *B60L 7/26* (2013.01); *B60T 7/042* (2013.01); *B60T 8/94* (2013.01); *B60T 13/586* (2013.01);
(Continued)

(58) Field of Classification Search
CPC .... B60T 13/686; B60T 13/745; B60T 13/586; B60T 2270/60; B60T 2270/604;
(Continued)

(56) References Cited

U.S. PATENT DOCUMENTS

| 9,879,972 B2* | 1/2018 | Kato ........................ G01B 7/14 |
| 2010/0176653 A1* | 7/2010 | Arakawa ............... B60T 13/745 |
| | | 303/10 |

(Continued)

FOREIGN PATENT DOCUMENTS

| CN | 103085785 A | 5/2013 |
| CN | 105523028 A | 4/2016 |

(Continued)

*Primary Examiner* — Bradley T King
(74) *Attorney, Agent, or Firm* — Bayramoglu Law Offices LLC

(57) ABSTRACT

An electro-hydraulic braking system includes a main casing. A hydraulic unit brake master cylinder is provided in the main casing. An outer end of a piston rod of the brake master cylinder is connected to an output top rod. Another end of the output top rod is provided with an input rod. The input rod is slidably connected in the main casing along only a length direction of the input rod, and another end of the input rod is provided with a push rod that is configured to transmit a brake pedal force. The main casing is further provided therein with a reset member configured to push the push rod away from the brake master cylinder to reset and a displacement sensor configured to sense a displacement of the push rod. The input rod and the output top rod include a spacing state and an abutment state.

8 Claims, 3 Drawing Sheets

(51) Int. Cl.
*B60T 7/04* (2006.01)
*B60T 8/94* (2006.01)
*B60T 13/58* (2006.01)
*G01D 5/14* (2006.01)
*B60T 8/40* (2006.01)

(52) U.S. Cl.
CPC .............. *B60T 13/74* (2013.01); *G01D 5/145* (2013.01); *B60T 8/4081* (2013.01); *B60T 13/745* (2013.01); *B60T 2270/402* (2013.01); *B60T 2270/604* (2013.01); *B60T 2270/82* (2013.01)

(58) Field of Classification Search
CPC ........... F16D 2066/003; F16D 2125/40; F16D 2125/48; G01D 5/145; G01B 7/003
See application file for complete search history.

(56) References Cited

U.S. PATENT DOCUMENTS

| | | | |
|---|---|---|---|
| 2012/0019235 A1* | 1/2012 | Post | B60L 13/06 324/207.13 |
| 2012/0073286 A1* | 3/2012 | Takayama | B60T 13/745 60/538 |
| 2012/0200147 A1* | 8/2012 | Endo | B60T 8/38 303/3 |
| 2013/0199364 A1* | 8/2013 | Weiberle | B60T 8/4077 92/261 |
| 2013/0297164 A1* | 11/2013 | Lauffer | B60W 10/18 701/70 |
| 2014/0197680 A1* | 7/2014 | Gilles | B60T 8/3275 303/2 |
| 2014/0265542 A1* | 9/2014 | Boswell | B60T 13/142 303/3 |
| 2014/0354035 A1* | 12/2014 | Khan | B60T 13/586 303/6.01 |
| 2016/0238410 A1* | 8/2016 | Steinich | G01D 5/145 |
| 2017/0327098 A1* | 11/2017 | Leiber | B60T 13/745 |
| 2018/0162330 A1* | 6/2018 | Odaira | B60T 8/171 |
| 2018/0251114 A1* | 9/2018 | Deberling | F16H 25/2018 |
| 2019/0047532 A1* | 2/2019 | Ohm | F16H 25/2003 |
| 2019/0232928 A1* | 8/2019 | Adachi | B60T 11/18 |
| 2020/0023828 A1* | 1/2020 | Fukayama | B60T 13/148 |
| 2020/0339090 A1* | 10/2020 | Boehm | F16H 25/24 |
| 2021/0245724 A1* | 8/2021 | Nagel | B60T 7/042 |

FOREIGN PATENT DOCUMENTS

| | | | | |
|---|---|---|---|---|
| CN | 107031597 A | 8/2017 | | |
| CN | 110341677 A | 10/2019 | | |
| CN | 209541657 U | 10/2019 | | |
| CN | 111267812 A | 6/2020 | | |
| CN | 210653065 U | 6/2020 | | |
| CN | 111907499 A | 11/2020 | | |
| DE | 102015217522 A1 | * | 3/2017 | ............. B60T 11/18 |
| DE | 102015226508 A1 | * | 6/2017 | ............. B60T 13/02 |
| EP | 2503359 A1 | 9/2012 | | |

\* cited by examiner

ELECTRO-HYDRAULIC BRAKING SYSTEM AND BRAKING METHOD THEREOF

CROSS REFERENCE TO RELATED APPLICATIONS

This application is a Continuation application of International Application No. PCT/CN2021/110824, filed on Aug. 5, 2021, which is based upon and claims priority to Chinese Patent Applications No. 202010787359.3, filed on Aug. 7, 2020, the entire contents of which are incorporated herein by reference.

TECHNICAL FIELD

The present disclosure relates to the field of vehicle braking systems, and in particular, to an electro-hydraulic braking system and a braking method thereof.

BACKGROUND

A motor vehicle braking system typically relies on an engine intake system to provide a vacuum source for a brake booster, to boost a brake master cylinder. For the braking system, a braking response speed increases and a vehicle braking distance is shortened, thereby improving vehicle safety. However, this mechanical booster cannot provide a sufficient boost for the braking system in a case of no vacuum or inadequate vacuum.

In order to solve the problem of the insufficient boost, most manufacturers have proposed an electric braking system, which uses a motor-assisted boost to replace a vacuum-assisted boost. The electric braking system typically includes a power unit, a transmission unit, a controller, and a brake master cylinder. The controller is used to control the power unit (generally being a brushless motor or a brushed motor) to respond quickly to a driver's braking requirement.

According to the solution proposed by these manufacturers, a brake pedal and a brake cylinder are not decoupled. During a deceleration process, the brake cylinder generates a hydraulic pressure for a braking operation when the brake pedal is pressed down, which cannot realize braking energy recovery. Even if a control strategy is configured to superimpose the electric braking on the mechanical hydraulic braking to complete the braking operation, an energy recovery rate is low. As a result, such a structure is not conducive to the promotion and application of products, especially in the application of electric vehicles.

SUMMARY

An objective of the present disclosure is to provide an electro-hydraulic braking system, in which a brake pedal and a hydraulic mechanism are decoupled. After the brake pedal is pressed down, a motor is used as a primary torque provider. When a motor capability cannot satisfy a braking requirement, the hydraulic braking is used as a compensation for an insufficient braking torque. In this way, a proportion of the electric braking is increased, thereby improving an energy recovery rate.

The foregoing technical objectives of the present disclosure are achieved by using the following technical solutions.

An electro-hydraulic braking system includes a main casing. A hydraulic unit brake master cylinder is provided in the main casing. An outer end of a piston rod of the brake master cylinder is connected to an output top rod. Another end of the output top rod is provided with an input rod. The input rod is slidably connected in the main casing along only a length direction of the input rod, and another end of the input rod is provided with a push rod that is configured to transmit a brake pedal force.

The main casing is further provided therein with a reset member configured to push the push rod away from the brake master cylinder to reset and a displacement sensor configured to sense a displacement of the push rod. The input rod and the output top rod include a spacing state and an abutment state. In the spacing state, a system performs a regenerative brake by a vehicle drive motor torque; and in the abutment state, the system uses the regenerative brake of the vehicle drive motor torque as a primary braking force, and uses hydraulic braking generated by the output top rod pushing the piston rod of the brake master cylinder as a compensatory braking force.

Further, the displacement sensor includes a magnetic element and a Hall sensor. The Hall sensor is configured to sense a relative displacement of the magnetic element.

Further, the magnetic element includes multiple lateral magnetic blocks and longitudinal magnetic blocks that are distributed along a moving direction of the push rod. Two magnetic blocks of all of the lateral magnetic blocks are located on the same straight line and have the same north magnetic pole orientation. One of the longitudinal magnetic blocks is provided between adjacent lateral magnetic blocks. A direction of connecting lines between two magnetic poles of the longitudinal magnetic blocks is perpendicular to a direction of connecting lines between two magnetic poles of the lateral magnetic blocks. Adjacent longitudinal magnetic blocks have opposite north magnetic pole orientations.

Further, an outer circumference of the input rod is provided with a thread. A threaded bushing adapted to the thread is sleeved outside the input rod. The threaded bushing is only rotatably connected in the main casing. A power unit configured to drive the threaded bushing to rotate is provided in the main casing.

Further, the power unit includes a power-assisted motor. An output end of the power-assisted motor is coaxially provided with a pinion. An idler gear and an output gear are rotatably connected in the main casing. The idler gear is a two-stage double helical gear, one stage being externally engaged with the pinion, and the other stage being externally engaged with the output gear. The output gear is sleeved outside the threaded bushing and configured to drive the threaded bushing to rotate.

Further, the threaded bushing is externally provided with an external spline, and an inner circumference of the output gear is provided with an internal spline matched with the external spline.

Further, the input rod and the push rod are connected by means of a spherical hinge.

Further, the input rod includes an adjustment pad block that is detachably connected at an end of the input rod close to the output top rod. A gap is provided between the adjustment pad block and the output top rod.

Another objective of the present disclosure is to provide an electro-hydraulic braking method, which can increase the proportion of the electric braking, thereby improving the energy recovery rate.

The foregoing technical objectives of the present disclosure are achieved by using the following technical solutions.

A braking method, in a case that a vehicle has a braking requirement, braking energy recovery is performed, includes the following operations:

S1. after a brake pedal is pressed down, driving, by a pedal force, the input rod to move forward via the push rod, to make the input rod first approach toward the output top rod;

S2. sensing, by a stroke sensor, a current displacement of the push rod and a displacement speed of the push rod, to speculate the braking requirement and calculate a required braking force, so as to perform a regenerative brake by a vehicle drive motor torque; and S3. after the input rod eliminates the gap with the output top rod and enters into the abutment state, which indicates that a drive motor capability cannot satisfy the braking requirement, driving, by the pedal force and a power unit, the output top rod to continue to move forward, so as to push the piston rod of the brake master cylinder to generate a hydraulic braking force. The regenerative brake of the drive motor torque is used as a primary braking force, and the hydraulic braking force is used as a compensatory braking force.

Further, in a brake-by-wire mode, the power-assisted motor for braking generates an only push force for the piston rod of the brake master cylinder, so as to generate hydraulic braking.

In a case that the power-assisted motor or an electrical control system fails, safe backup braking is performed. The pedal force directly pushes the brake master cylinder, which acts as the only push force for the piston rod of the brake master cylinder, so as to generate the hydraulic braking.

To sum up, the present disclosure has the following beneficial effects.

The brake pedal and the hydraulic mechanism are decoupled. After the brake pedal is pressed down, a controller, based on a current angle and angular velocity of the pedal that are obtained by the stroke sensor, speculates the driver's braking requirement, and calculates a required braking force. The motor is used as the primary torque provider. When the braking deceleration requirement is large and the motor braking force is insufficient (the motor capacity cannot satisfy the braking requirement), the hydraulic braking is used as the compensation for the insufficient braking torque. In this way, the proportion of the electric braking is increased, thereby enhancing energy recovery.

By arranging the magnetic blocks according to characteristics of the north magnetic poles and south magnetic poles, the magnetic element is allowed to have a large magnetic field line monotone region when having a small size structure. The specific arrangement of the magnetic blocks ensures that directions of magnetic field lines are unique at any positions within an effective working region of the magnetic element. The Hall chip is provided inside the displacement sensor, which is used to obtain a displacement amount of the push rod by sensing the directions of the magnetic field lines at different positions of the magnetic element, and obtain a displacement speed of the push rod by calculating angle changing rates of the magnetic field lines. In addition, a measurement stroke of the displacement sensor can be made large according to the arrangement. The moving member and the induction member in the electromagnetic induction displacement sensor are non-contact. Thus, compared with a contact resistive displacement sensor, the electromagnetic induction displacement sensor has a longer service life and a better anti-electromagnetic interference effect.

In the figure, 1. pedal connector; 2. push rod; 3. retaining ring; 4. push rod spring; 5. push rod spring seat; 6. spring seat; 7. magnetic element; 8. Hall sensor; 9. reset spring; 10. threaded rod; 11. threaded bushing; 12. output gear; 13. idler gear; 14. pinion; 15. power-assisted motor; 17. brake master cylinder; 19. output top rod; 20. base; 21. buffer block; 23. input rod; 25. main casing; 26. secondary casing; 50. guiding rod; and 51. bracket.

DETAILED DESCRIPTION OF THE EMBODIMENTS

The specific implementation manners of the present disclosure are further described in detail with reference to accompanying drawings as follows, which are not intended to limit the present disclosure.

Figure 1:
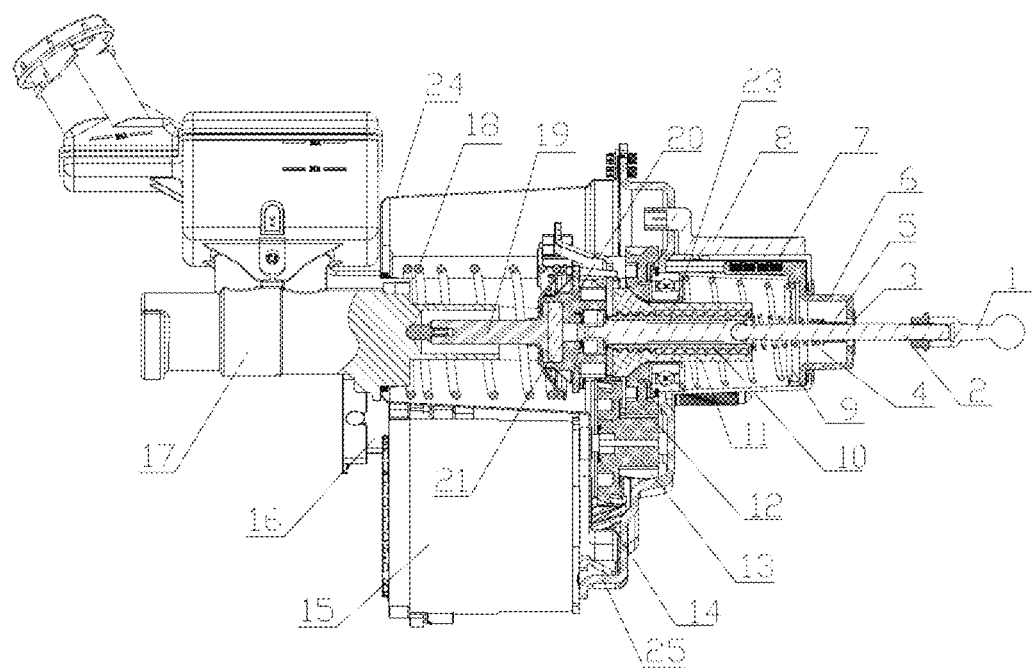
FIG. 1 is a schematic diagram showing an overall structure according to the present disclosure.

As shown in FIG. 1, an electro-hydraulic braking system includes a main casing 25. A hydraulic unit brake master cylinder 17 is fixed in the main casing 25. An outer end of a piston rod of the brake master cylinder 17 is coaxially fixed and connected with an output top rod 19. Another end of the output top rod 19 is coaxially provided with an input rod 23. The input rod 23 is slidably connected in the main casing 25 along only a length direction of the input rod 23. Another end of the input rod 23 is connected by means of a spherical hinge with a push rod 2 that is configured to transmit a brake pedal force. The connection manner of the spherical hinge is superior to a connection manner that only provides one rod. Since a motion trajectory of the pedal is arc-shaped, the spherical hinge can improve motion insensitivity due to assembly misalignment and a swing angle of the pedal.

Figure 2:
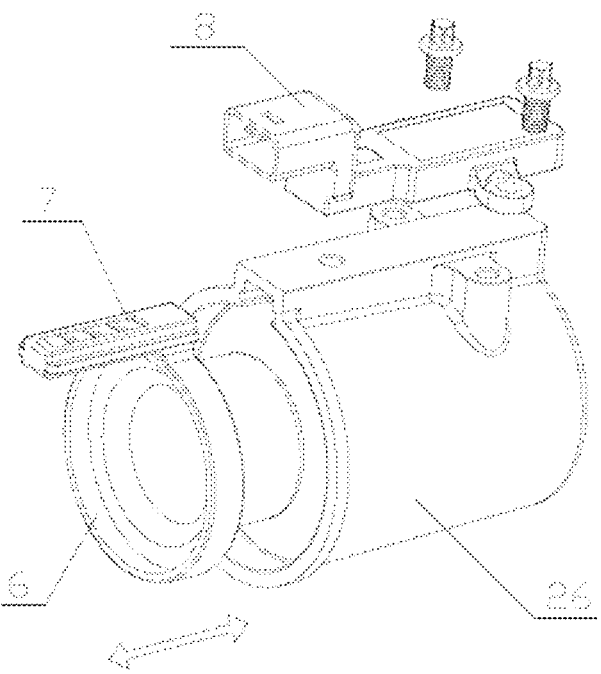
FIG. 2 is a schematic diagram showing the installation of a displacement sensor according to the present disclosure.

As shown in FIG. 1 and FIG. 2, a retaining ring 3 is fixed outside the push rod 2. A side of the retaining ring 3 close to the brake master cylinder 17 is abutted against or fixed with a spring seat 6. The spring seat 6 is sleeved outside the push rod 2. The main casing 25 includes a secondary casing 26 fixed at an end of the main casing 25 away from the brake master cylinder 17. The secondary casing 26 is sleeved outside the spring seat 6. An outer end of the secondary casing 26 is also connected with a limit bending arranged in a moving direction of the spring seat 6. The main casing 26 is further provided therein with a reset member configured to push the spring seat 6 away from the brake master cylinder 17 to reset and a displacement sensor configured to sense a displacement of the push rod 2.

As shown in FIG. 1, the reset member may be a spiral cylindrical spring or a truncated cone spring, or an elastic rubber, or a combination of a spring and a rubber. The spring may have equal pitches or unequal pitches. In this embodiment, the reset member includes a reset spring 9. The reset spring 9 is sleeved outside the push rod 2 and the input rod 23. An end of the reset spring 9 abuts in the main casing 25, and the other end of the reset spring 9 abuts against an inner end face of the spring seat 6, so as to push the spring seat 6 outward, thereby pushing the push rod 2 outward to reset via the retaining ring 3.

As shown in FIG. 2, the displacement sensor includes a magnetic element 7 fixed on an outer peripheral surface of the spring seat 6 and a Hall sensor 8 fixed on an inner peripheral surface of the secondary casing 26. The Hall sensor 8 is configured to sense a relative displacement of the magnetic element 7. Working on the principle of Hall Effect, when there is a relative displacement between the sensor and the magnetic element 7, a chip inside the sensor produces different electrical signals, based on which a line displacement amount of the magnetic element 7 can be calculated. That is, a displacement amount of the push rod 2 is obtained based on a signal outputted by the displacement sensor.

Figure 3:
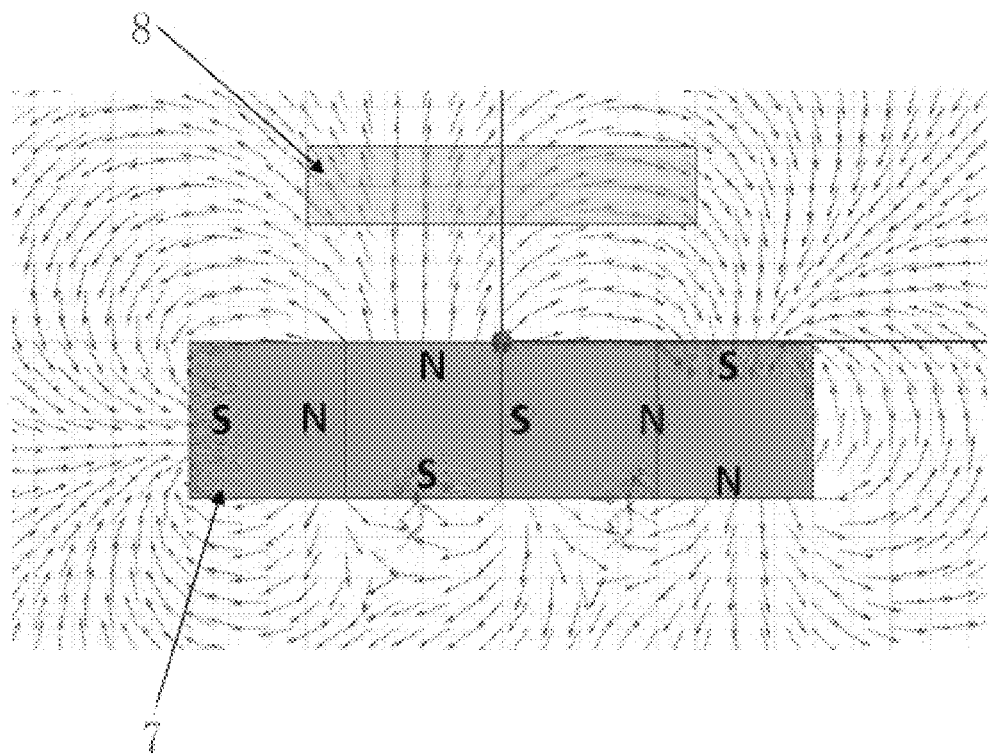
FIG. 3 is a schematic diagram showing a principle of a magnetic field change of a displacement sensor according to the present disclosure.

As shown in FIG. 3, the magnetic element 7 includes multiple lateral magnetic blocks and longitudinal magnetic blocks that are distributed along a moving direction of the push rod 2. Two magnetic blocks of all the lateral magnetic blocks are located on the same straight line and have the same north magnetic pole orientation. One longitudinal magnetic block is provided between adjacent lateral magnetic blocks. A direction of connecting lines between two magnetic poles of the longitudinal magnetic blocks is perpendicular to a direction of connecting lines between two magnetic poles of the lateral magnetic blocks. Adjacent longitudinal magnetic blocks have opposite north magnetic pole orientations.

As shown in FIG. 2, the displacement sensor is a stationary fixing member. The secondary casing 26 is provided with a positioning hole. After assembly, the displacement sensor is fixed with respect to an axial position of the secondary casing 26, and then secured on the secondary casing 26 by a fixing screw. The magnetic element 7 is a moving member. The magnetic element 7 is provided with a guiding convex structure, and an outer circumference of the spring seat 6 is provided with a guiding concave groove. The convex structure and the concave structure are cooperated with each other when assembly, so as to allow a straight-line reciprocating movement of the magnetic element 7. This ensures the reliability of the displacement signal output, thereby avoiding signal drift, weak signal output or even no signal output due to shaking of the magnetic element 7.

As shown in FIG. 3, in this embodiment, the magnetic element 7 includes two lateral magnetic blocks and two longitudinal magnetic blocks that are distributed along the moving direction of the push rod 2, sequentially being a lateral magnetic block with a north magnetic pole pointing to the remaining magnetic blocks, a longitudinal magnetic block with a north magnetic pole pointing to a side facing the Hall sensor 8, a lateral magnetic block with a north magnetic pole pointing to the same direction as the previous lateral magnetic block, and a longitudinal magnetic block with a north magnetic pole pointing to a side facing away from the Hall sensor 8.

The specific arrangement of the magnetic blocks ensures that the directions of the magnetic field lines are unique at any positions within the effective working region of the magnetic element 7. The displacement amount of the push rod 2 is obtained by sensing the directions of the magnetic field lines at different positions of the magnetic element, and the displacement speed of the push rod 2 is obtained by calculating the angle changing rates of the magnetic field lines. In addition, the measurement stroke of the displacement sensor can be made large in accordance with this arrangement. The moving member and the induction member in the electromagnetic induction displacement sensor are non-contact. Thus, compared with the contact resistive displacement sensor, the electromagnetic induction displacement sensor has a longer service life and a better anti-electromagnetic interference effect.

As shown in FIG. 1, the displacement sensor and the magnetic element 7 are both mounted at a rear end of a system mounting surface. For an actual vehicle, the rear end of the mounting surface is located in a cockpit, and a front end of the mounting surface is located in an engine compartment. Thus, in actual application, the sensor and the magnetic element 7 are located in the cockpit where the ambient temperature is suitable. The cockpit suffers less electromagnetic interference and vibration due to a distance from the engine compartment which has an atmosphere of a high temperature and a high humidity. This electromagnetic sensor generally has output signal temperature drift at high temperatures, which results in a large error in the signal output. Besides, a magnetic field strength of the magnetic element 7 at high temperatures is weakened and cannot be recovered. Thus, the placement of the sensor in the cockpit is conducive to improving an accuracy of its signal output.

As shown in FIG. 1, the input rod 23 is provided with a hollow threaded rod 10 sleeved outside an outer circumference of the input rod 23. An outer circumference of the threaded rod 10 is provided with a thread. A threaded bushing 11 is sleeved outside the threaded rod 10, to be adapted to the thread of the threaded rod 10. The threaded bushing 11 is fixed outside the input rod 23 by means of a key connection. The threaded bushing 11 is only rotatably connected in the main casing 25.

Figure 4:
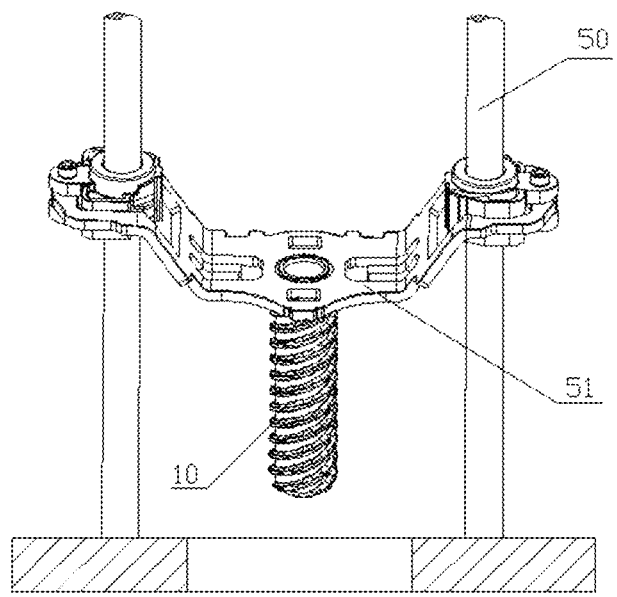
FIG. 4 is a schematic diagram showing the connection structure of the threaded rod according to the present disclosure.

As shown in FIG. 4, in this embodiment, an end of the threaded rod 10 away from the brake master cylinder 17 is connected with a bracket 51. Two guiding rods 50 parallel to the threaded bushing 11 are fixed in the main casing 25 or a vehicle body. The guiding rods 50 pass through the bracket 51 and are configured to guide the bracket 51 to slide, so as to ensure that the input rod 23 is slidably connected in the main casing 25 along only the length direction of the input rod 23. The threaded rod 10 is only allowed to perform an axis movement along the guiding rod 50, so as to generate a push force.

As shown in FIG. 1, the main casing 25 is also provided with a power unit therein, which is configured to drive the threaded bushing 11 to rotate. The power unit includes a power-assisted motor 15 fixed in the main casing 25. An output end of the power-assisted motor 15 is coaxially connected with a pinion 14. An idler gear 13 and an output gear 12 are rotatably connected in the main casing 25. The idler gear 13 is fixed to the main casing 25 by a central axis. The idler gear 13 is a two-stage double helical gear, one stage being externally engaged with the pinion 14, and the other stage being externally engaged with the output gear 12. The output gear 12 is sleeved outside the threaded bushing 11 and configured to drive the threaded bushing 11 to rotate.

In this embodiment, the threaded bushing 11 is externally provided with an external spline, and an inner circumference of the output gear 12 is provided with an internal spline matched with the external spline, so that the rotation of the output gear 12 drives the threaded bushing 11 to rotate, and at the same time, transmits a torque to make the threaded bushing 11 to rotate.

As shown in FIG. 1, an end of the output gear 12 away from the brake master cylinder 17 is riveted with a bearing. An outer ring of the bearing is connected with the secondary casing 26 in an interference connection manner, so as to be fixed to the main casing 25. An inner ring of the bearing is riveted with the output gear 12, to ensure that the output gear 12 only freely rotates in the main casing 25 along a circumferential direction without moving. The secondary casing 26 is molded by die-cast aluminum molding or sheet metal punching. The secondary casing 26 is assembled with the bearing of the output gear 12 in an interference-fit manner, which can withstand a pre-compression force of the reset spring 9.

As shown in FIG. 1, an end of the reset spring 9 away from the spring seat 6 is abutted against the outer ring of the bearing. The reset spring 9 may be adjusted according to different vehicle requirements, to match different pedal forces under a condition that other components are not changed. When the brake pedal is pressed down, the reset spring 9 is compressed, to generate a braking reaction force. The pre-compression force and a hardness of the reset spring 9 directly determine a degree of comfort of the pedal. In addition, under the control of the boost of the power-assisted motor, some vehicles may have two brake pedal modes of a motion mode and a comfort mode.

In this embodiment, the power-assisted motor 15 is fixed with a controller by a snap-fit connection or by glue. The glue generally uses an epoxy adhesive with high and low temperature resistance, which may be one-component or two-component. In this way, an integrated structure of power output and control system is formed. The controller receives a vehicle signal, such as a gear speed signal, a brake request signal, and etc., via a vehicle controller area network (CAN); and controls a torque output and a direction change of the power-assisted motor 15 by a logical calculation of a control strategy. The power-assisted motor 15 outputs a rotation angle signal and a rotational speed signal, configured to control a position, a direction, and a speed of a rotation of the power-assisted motor 15.

The logical calculation of the control strategy is as follows: when a driver presses down on the brake pedal, the displacement sensor generates a signal. As a depth that the pedal is pressed down increases, an output of the displacement sensor also increases. In this case, it is considered that the driver has a larger braking deceleration request. Thus, a larger current is used to control the power-assisted motor 15, so as to output a larger torque. When the driver releases the pedal, a braking pressure is reduced by stopping energizing the power-assisted motor 15 or reversely energizing the power-assisted motor 15.

As shown in FIG. 1, an end of the push rod 2 away from the input rod 23 is connected with a pedal connector 1 by means of a thread. The pedal connector 1 may be spherical or U-shaped, which is determined according to a connection structure of the brake pedal and is not detailed herein.

As shown in FIG. 1, the input rod 23 includes an adjustment pad block that is detachably connected at an end of the input rod 23 close to the output top rod 19. The output top rod 19 includes a buffer block 21 that is close to an end of the input rod 23. A gap is provided between the adjustment pad block and the buffer block 21. In a case of the mechanical braking, the input rod 23 needs to move forward to eliminate the gap (an idle stroke), and then the brake pedal force is transmitted to the piston rod of the brake master cylinder 17 via the output top rod 19, so as to generate a hydraulic braking force. A length of the idle stroke is adjusted by changing a height of the adjustment pad block, and then coordinates the pedal rod, a brake energy recovery point and a recovery proportion by using a control strategy.

As shown in FIG. 1, the input rod 23 and the output top rod 19 include a spacing state and an abutment state. In the spacing state, the system performs a regenerative brake by a vehicle drive motor torque. In the abutment state, the system uses the regenerative brake of the vehicle drive motor torque as a primary braking force, and uses the hydraulic braking generated by the output top rod 19 pushing the brake master cylinder 17 as a compensatory braking force.

Figure 5:
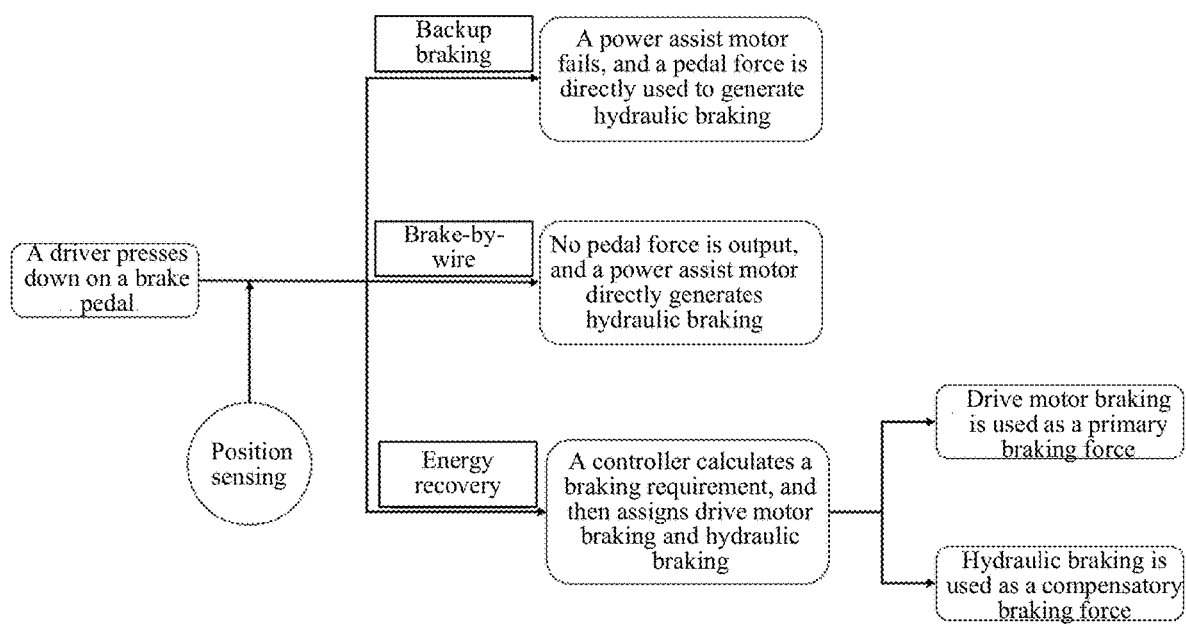
FIG. 5 is a flow chart showing braking force transmission in a system according to the present disclosure.

As shown in FIG. 5, when a vehicle has a braking requirement, braking energy recovery is performed. The braking includes the following operations:

S1. After the brake pedal is pressed down, a pedal force drives the input rod 23 to move forward via the push rod 2. The pedal braking force does not directly reach the brake master cylinder 17. The input rod 23 first approaches toward the output top rod 19.

S2. At the same time, since there is a relative displacement between the magnetic element 7 and the displacement sensor, a current displacement and displacement speed of the push rod 2 are sensed by the stroke sensor, so that a driver's braking requirement is speculated and a required braking force is calculated, based which a motor torque output is calculated and controlled. The regenerative brake is performed by the vehicle drive motor torque.

Specifically, a larger displacement amount indicates a larger braking force required by the driver, and a larger displacement speed of the push rod 2 indicates a faster pressure build-up rate required by the driver. Thus, the motor rotation speed needs to be accelerated. When the rate exceeds a set threshold, emergency braking is performed. The power-assisted motor runs at full speed, to provide maximum brake assist.

S3. After the input rod 23 eliminates the gap with the output top rod 19 and enters into the abutment state, which indicates that the drive motor capability cannot satisfy the braking requirement, the pedal force and the power unit drive the output top rod 19 to continue to move forward, so as to push the piston rod of the brake master cylinder 17 to generate a hydraulic braking force. The regenerative brake of the vehicle power motor torque is used as the primary braking force (namely feedback braking), and the hydraulic braking is used as a compensation for the insufficient braking force.

The proportion of the motor braking is increased by the pedal displacement sensor and the idle stroke. The generated electrical energy is stored, thereby enhancing the energy recovery.

As shown in FIG. 5, in a brake-by-wire mode, there is no need to press down on the brake pedal. The power-assisted motor 15 for braking generates an only push force for the piston rod of the brake master cylinder 17, to generate the hydraulic braking.

In a case that the power-assisted motor 15 or an electrical control system fails, safe backup braking is performed. The pedal force directly pushes the brake master cylinder 17, acting as the only push force for the piston rod of the brake master cylinder 17, to generate the hydraulic braking. In this case, since the power-assisted motor 15 is not energized, the threaded bushing 11 does not rotate. The threaded rod 10 moves forward, along with which the threaded bushing 11 moves forward in a straight line, so as to slow down or safely stop the vehicle.

The foregoing descriptions are merely exemplary examples of the present disclosure, but are not intended to limit the present disclosure. A person skilled in the art can make various modifications or equivalents to the present disclosure within the spirit and scope of the present disclosure. All these modifications or equivalents shall be considered to fall within the protection scope of the technical solutions of the present disclosure.

What is claimed is:

1. An electro-hydraulic braking system, comprising: a main casing; wherein a hydraulic unit brake master cylinder is provided in the main casing, an outer end of a piston rod of the brake master cylinder is connected to a first end of an output top rod, a second end of the output top rod is provided with an input rod, a first end of the input rod is slidably connected in the main casing along only a length direction of the input rod, and a second end of the input rod is provided with a push rod, and the push rod is configured to transmit a force from a brake pedal;

a reset member and a displacement sensor are provided in the main casing, wherein the reset member is configured to push the push rod away from the brake master cylinder to reset and the displacement sensor is configured to sense a displacement of the push rod; and the input rod and the output top rod are set to be spaced or abutted on each other; when the input the input rod and the output top rod are spaced, a system performs a regenerative brake by a vehicle drive motor torque; when the input the input rod and the output top rod are abutted on each other, the system uses the regenerative brake of the vehicle drive motor torque as a primary braking force, and uses hydraulic braking generated by the output top rod pushing the piston rod of the brake master cylinder as a compensatory braking force;

the displacement sensor comprises a magnetic element and a Hall sensor, and the Hall sensor is configured to sense a relative displacement of the magnetic element;

the magnetic element comprises lateral magnetic blocks and longitudinal magnetic blocks, wherein the lateral magnetic blocks and the longitudinal magnetic blocks are distributed along a moving direction of the push rod, the lateral magnetic blocks are located on the same straight line and have the same north magnetic pole orientation, one of the longitudinal magnetic blocks is provided between adjacent lateral magnetic blocks among the lateral magnetic blocks, a direction of a connecting line between two magnetic poles of each of the longitudinal magnetic blocks is perpendicular to a direction of a connecting line between two magnetic poles of each of the lateral magnetic blocks, and adjacent longitudinal magnetic blocks among the longitudinal magnetic blocks have opposite north magnetic pole orientations.

2. The electro-hydraulic braking system according to claim 1, wherein an outer circumference of the input rod is provided with a thread, a threaded bushing adapted to the thread is sleeved outside the input rod, and the threaded bushing is only rotatably connected in the main casing; and a power unit configured to drive the threaded bushing to rotate is provided in the main casing.

3. The electro-hydraulic braking system according to claim 2, wherein the power unit comprises a power-assisted motor, an output end of the power-assisted motor is coaxially provided with a pinion, an idler gear and an output gear are rotatably connected in the main casing, the idler gear is a two-stage double helical gear with a first stage being externally engaged with the pinion, and a second stage being externally engaged with the output gear, and the output gear is sleeved outside the threaded bushing and configured to drive the threaded bushing to rotate.

4. The electro-hydraulic braking system according to claim 2, wherein the threaded bushing is externally provided with an external spline, and an inner circumference of the output gear is provided with an internal spline matched with the external spline.

5. The electro-hydraulic braking system according to claim 1, wherein the input rod and the push rod are connected by a spherical hinge.

6. The electro-hydraulic braking system according to claim 1, wherein the input rod comprises an adjustment pad block, the adjustment pad block is detachably connected at an end of the input rod close to the output top rod, and a gap is provided between the adjustment pad block and the output top rod.

7. A braking method of the electro-hydraulic braking system according to claim 1, when a vehicle has a braking requirement, braking energy recovery is performed, the braking method comprising:

S1: after the brake pedal is pressed down, driving, by a pedal force, the input rod to move forward via the push rod, to make the input rod approach toward the output top rod;

S2: sensing, by the displacement sensor, a current displacement of the push rod and a displacement speed of the push rod, speculating the braking requirement of a driver, calculating a required braking force, and performing the regenerative brake by the vehicle drive motor torque; and S3: after the input rod eliminates the gap with the output top rod by moving forward and the input rod abuts on the output top rod, driving, by the pedal force and a power unit, the output top rod to continue to move forward, allowing the output top rod to push the piston rod of the brake master cylinder to generate a hydraulic braking force when a drive motor capability cannot satisfy the braking requirement, wherein the regenerative brake of the vehicle drive motor torque is used as the primary braking force, and the hydraulic braking force is used as the compensatory braking force.

8. The braking method of the electro-hydraulic braking system according to claim 7, wherein, in a brake-by-wire mode, the power-assisted motor for braking generates an only push force for the piston rod of the brake master cylinder, to generate the hydraulic braking force; and when the power-assisted motor or an electrical control system fails, safe backup braking is performed, wherein the pedal force directly pushes the brake master cylinder, and the pedal force acts as the only push force for the piston rod of the brake master cylinder, to generate the hydraulic braking force.

* * * * *